March 29, 1966      W. J. TROTT      3,243,769

DISTRIBUTED COUPLING TRANSDUCER

Filed Aug. 30, 1962      3 Sheets-Sheet 1

INVENTOR
WINFIELD JAMES TROTT

BY

ATTORNEY

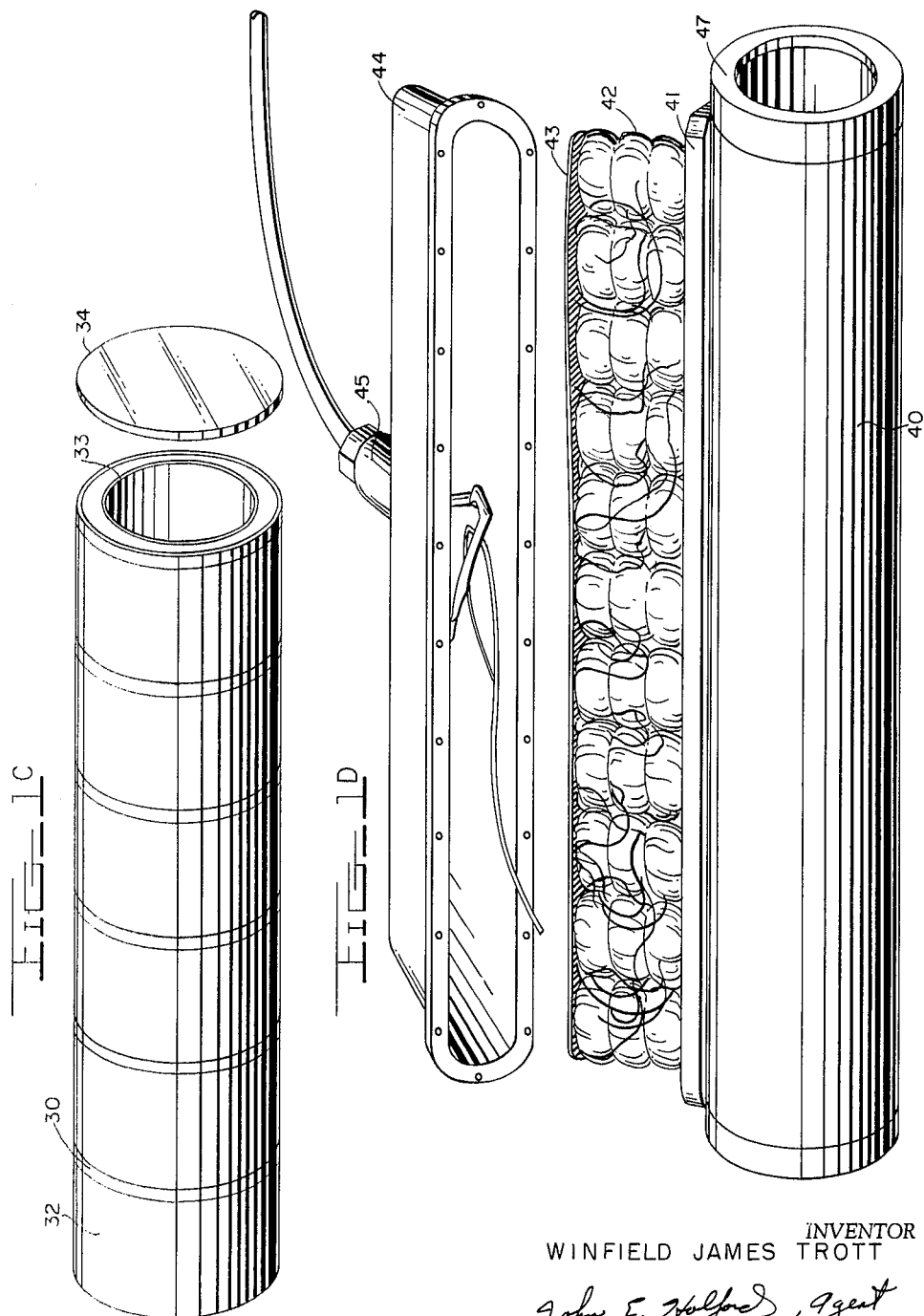

March 29, 1966  W. J. TROTT  3,243,769
DISTRIBUTED COUPLING TRANSDUCER
Filed Aug. 30, 1962  3 Sheets-Sheet 3
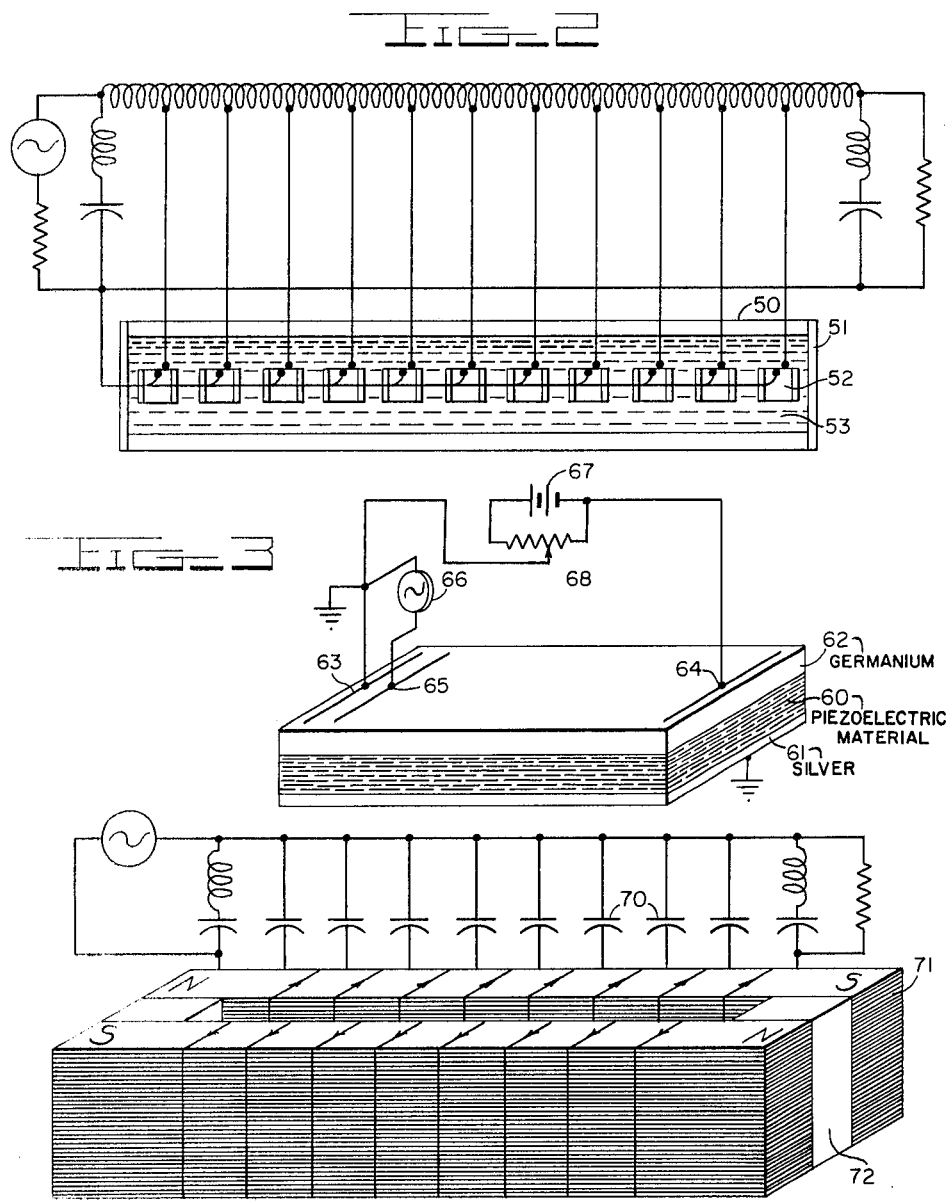
INVENTOR
WINFIELD JAMES TROTT
BY John E. Hulford, Agent
   Richard E. Reel
ATTORNEY

United States Patent Office 3,243,769
Patented Mar. 29, 1966

3,243,769
DISTRIBUTED COUPLING TRANSDUCER
Winfield James Trott, Orlando, Fla., assignor to the United States of America as represented by the Secretary of the Navy
Filed Aug. 30, 1962, Ser. No. 220,962
2 Claims. (Cl. 340—10)

The invention described herein may be manufactured and used by or for the Government of the United States of America for governmental purposes without the payment of any royalties thereon or therefor.

The present invention is directed to underwater transducers for converting electrical signals to sound or mechanical vibrations and the reverse. More particularly, it concerns transducers which can handle a broad band of frequencies which includes higher frequencies than those employed heretofore.

In order to provide high power projectors in the past, resonant transducers have usually been employed. The frequency of operation in such cases was generally determined by the structure of the transducer. The frequency of operation, therefore, could not be altered at will and the information transmitted was very limited.

An object of the present invention is, therefore, to provide a reciprocal transducer for underwater use, which handles high power levels efficiently over a broad band of frequencies.

A further object of the present invention is to provide a reciprocal transducer of the type described above wherein the mechanical elements and the electrical elements are arranged to form delay lines which are intercoupled at a plurality of points along their length.

A further object of the invention is to provide a transducer of the type described above wherein the delay lines are periodic in structure.

A further object of the invention is to provide a transducer of the type described above wherein the delay lines are uniform along their length.

These and other objects or attendant advantages of the present invention are best understood with reference to the following specification in conjunction with the accompanying drawings wherein:

FIG. 1C shows a second embodiment of the structure in FIGS. 1B and 1A;

FIG. 1D shows the structure of the entire transducer except for the portions depicted in FIGS. 1B and 1C;

FIG. 2 shows a third embodiment of the structure shown in FIG. 1A;

FIG. 3 shows a fourth embodiment of the structure of FIG. 1A and including the structure of the electrical delay line which is composed of a semiconductor material; and FIG. 4 shows a fifth embodiment of the structure shown in FIG. 1A which employs magnetostrictive material in the mechanical delay line.

Figure 1A:
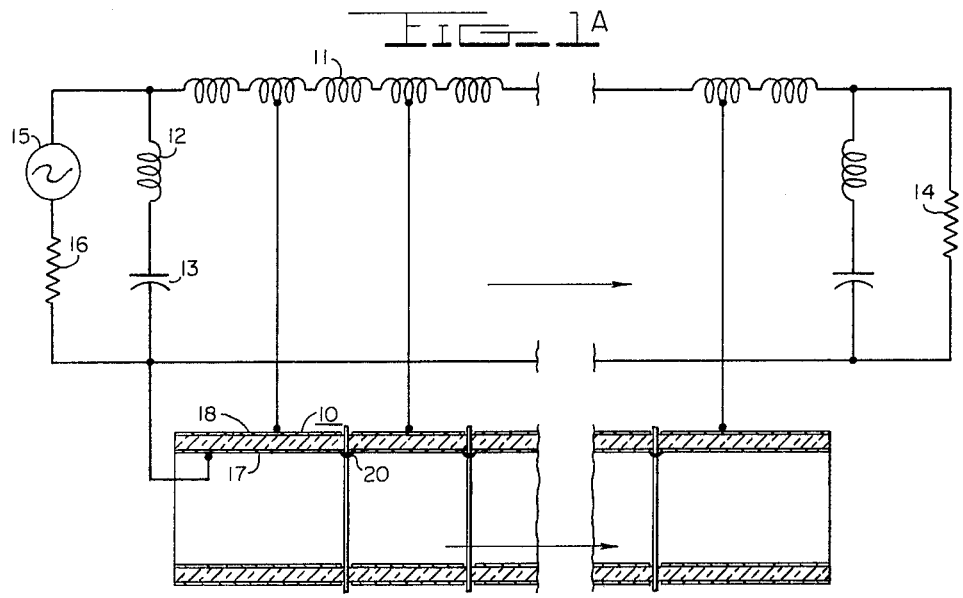
FIG. 1A shows a partly structural, partly schematic representation of the electrical and mechanical delay lines used in one embodiment of the transducer.

Referring to FIG. 1A, the relationship of the operating portions of the transducer can be seen. Essentially the transducer is composed of two delay lines, one electrical and the other mechanical. The two lines are not independent, however, there being at least one element in each repeated line section common to both lines which has both electrical and mechanical properties. In this first embodiment the common element is a piezoelectric capacitor. If the phase velocities of the two lines are nearly equal, energy will couple gradually from one line to the other.

The electrical delay line is formed of a plurality of T or pi sections, consisting of series inductances 11 and shunt capacitors 10. The sections are $m$-derived using an $m$ equal to $\sqrt{3}$. The ends of the line are terminated first with end sections including inductance 12 and capacitor 13 based on an $m$ equal to 0.6 and finally in resistive loads equal to the characteristic or image impedance of the line. One load 14 acts as an absorber to prevent reflections from building up on the line, and the other load is a transmitter or receiver 15 including a series resistor 16, if necessary, to provide the image impedance. Many texts contain a complete analysis of this type of line, as for example, Guillemin, Communication Networks, vol. II, published by John Wiley and Sons, 1935.

The mechanical delay line consists essentially of the capacitors 10 which use piezoelectric material as a dielectric. This material is formed in the shape of hollow cylinders which are radially polarized. Each cylinder is provided with an inner electrode 17 and an outer electrode 18 in the form of coatings which substantially cover the curved surfaces of the cylinder.

Figure 1B:
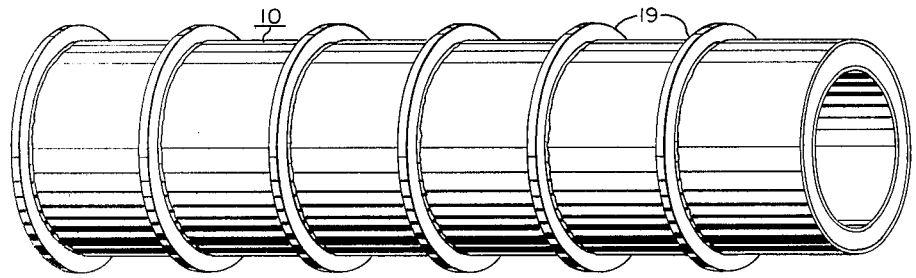
FIG. 1B shows a pictorial view of the structure in FIG. 1A.

FIG. 1B shows a pictorial view of the mechanical delay line. The cylinders are cemented end to end with a conducting washer-shaped shield 19 interposed between adjacent cylinders. These shields are electrically connected to the inner electrodes, but insulated from the outer electrode either by spacing the electrode from the ends of the cylinders as shown or by coating the flat surfaces of the shields with a suitable dielectric.

Suitable materials for the various parts are readily available. The inductances are wound from an appropriate gauge of magnet wire and may include an iron core material, if desired. Standard tubular capacitors operate satisfactorily at audio frequencies. The newer lead zirconate ceramics are preferred as a piezoelectric material although other materials such as quartz can be used. The electrodes generally consist of a silver plating or deposit. The shields were made from brass although any conducting metal would have served. The cementing agent was an epoxy resin and the electrical connection between the inner electrodes and the shields was effected by means of a small solder bead 20.

Another similar embodiment of the invention is shown in FIG. 1C. Instead of separate cylinders this transducer uses a single long hollow cylinder 30. The inside of the cylinder is plated with an electrode 33 which serves as a common current return. The outer surface is plated with separate bands 32 of current conducting material which serve as electrodes similar to those shown in FIGS. 1A and 1B. The inside of the cylinder is closed by end caps 34 which may be either metal or ceramic.

The operation of this device is similar to that of the embodiment previously described, except that radiation takes place from the end caps of the air filled cylinder. A suitable material for the end caps is beryllium. A member of higher conductivity may be attached to the surface of the end caps to provide an external terminal for electrode 33.

FIG. 1D shows a protective housing which may be used with either of the above mentioned embodiments. A rigid hollow metal pipe 40 is welded securely to a metal mounting plate 41. A series of apertures or a slot (not shown) is drilled through the plate and pipe at their point of tangency to admit the leads from inductor coils 42, which provide the series inductance for the electrical delay line. The tops of the coils are braced by means of a mounting strip 43 connected by wire braces to plate 41. One of the ceramic tubes shown in FIGS. 1A–1C is inserted in the pipe and secured at each end by means of a butyl rubber grommet 47. This grommet grips the tube and pipe at their ends around their entire circumference, preventing the egress of water between the two when submerged. The leads of the coils are attached to appropriate electrodes on the tube by soldering or other electrical connecting means.

To complete the housing structure a metal cover 44 is placed over the coils and fastened to the plate 41. Suitable gaskets (not shown) may be used to effect a good seal between the two. Leads 46 are connected to the coils and inner current return electrode of the ceramic tube, and a conventional seal 45 is provided to pass these leads through the cover to the sound transmitter or receiver. A typical model was made using 15 sections of one inch ceramic tube with a 1¼ inch inside diameter. The response was substantially flat from 4 kc. to 24 kc. except for a radial mode of resonance in the tube above 15 kc.

FIG. 2 shows still a third embodiment of the ceramic tube structure. In this embodiment sections 52 of ceramic tube are enclosed in a stiff metal pipe 50 with stiff end walls 51. The sections have their axes normal to that of the pipe and are air filled with stiff end caps. Inner and outer electrodes are connected to the electrical delay line as previously described with regard to FIG. 1C. The space between the ceramic sections and the metal pipe is filled with oil 53. The metal pipe may be mounted in a housing as shown in FIG. 1D, if desired.

FIG. 3 shows a section of a transducer with continuous coupling. The transducer consists of a layer of piezoelectric material which may be in the form of a tube as previously described. The lower surface or inside of the tube is plated with a high conductivity layer 61, as for example, silver. The opposite surface is covered with a layer of semiconductor material, such as p-type germanium. First and second electrodes 63 and 64 are embedded in this layer at opposite ends of the piezoelectric material. These electrodes are maintained at a constant potential difference by a D.-C. source 67.

Acoustic signals are transmitted or received by a sonar transceiver unit 66. These signals are applied between the first electrode 63 and a third electrode 65 embedded in the semiconductive layer 62 adjacent the first electrode. One of the embedded electrodes is held at a fixed potential with respect to layer 61, as for example by grounding both electrode and layer. The complete unit may be mounted in a housing such as disclosed in FIG. 1D. Electromagnetic waves generated between electrodes 63 and 65 diffuse through the semiconductive layer to element 64 gradually transferring their energy to mechanical vibration of the layer 60. The rate of wave propagation in layer 62 is matched to that in layer 60 by varying potentiometer 68.

FIG. 4 shows a magnetostrictive embodiment of the invention. In this embodiment the series inductances form the common element between the electrical and the mechanical delay lines. Capacitors 70, which may be of the conventional tubular variety, supply the shunt capacity. The series inductance is obtained by a plurality of coils, here represented by one turn each wound in the same sense on the same core. The core is made of conventional transformer steel, i.e., low carbon with a substantial percentage of silicon added. The mechanical line requires prepolarization which may be supplied by permanent magnets 72 inserted in the line or by direct current applied to windings on the core. Sound is radiated or received from the ends of the core including the magnets 72.

Various modifications of the invention will be obvious to those skilled in the art. The tubes for example may be square or rectangular rather than round. Several transducers may be combined to form a single array, and these transducers may be coupled to a common electrical delay line. In beam steering arrangements where the phase of the transducers is constantly varying, however, each transducer must have its own electrical delay line.

Obviously many modifications and variations of the present invention are possible in the light of the above teachings. It is therefore to be understood that within the scope of the appended claims the invention may be practiced otherwise than as specifically described.

What is claimed is:

1. A sound transducer comprising: an electrical delay line; a mechanical delay line; portions of each of said lines being formed by a common piezoelectric capactive element including a plurality of hollow cylinders having electrodes attached to the curved surfaces thereof, said cylinders being axially arranged with at least a first electrode of adjacent cylinders separated, and a conducting shield mounted on said cylinder between said first electrodes; and said lines having substantially the same phase velocity whereby energy inserted in one of said lines is coupled gradually to the other of said lines.

2. A sound transducer comprising: an electrical delay line; a mechanical delay line; portions of each of said lines being formed by a common piezoelectric capacitive element including a continuous hollow cylinder having a single inner electrode, a plurality of outer electrodes mounted on the curved surfaces thereof and stiff end wall members closing the ends of said cylinder; and said lines having substantially the same phase velocity whereby energy inserted in one of said lines is coupled gradually to the other of said lines.

References Cited by the Examiner

UNITED STATES PATENTS

| 2,404,391 | 7/1946 | Mason | 340—10 |
| 2,930,912 | 3/1960 | Miller | 340—10 |

CHESTER L. JUSTUS, *Primary Examiner.*

KATHLEEN H. CLAFFY, MAYNARD R. WILBUR,
*Examiners.*

J. MORRIS, *Assistant Examiner.*